(No Model.)  3 Sheets—Sheet 1.
E. W. RICE, Jr.
SYSTEM OF ELECTRIC DISTRIBUTION.
No. 510,487.  Patented Dec. 12, 1893.
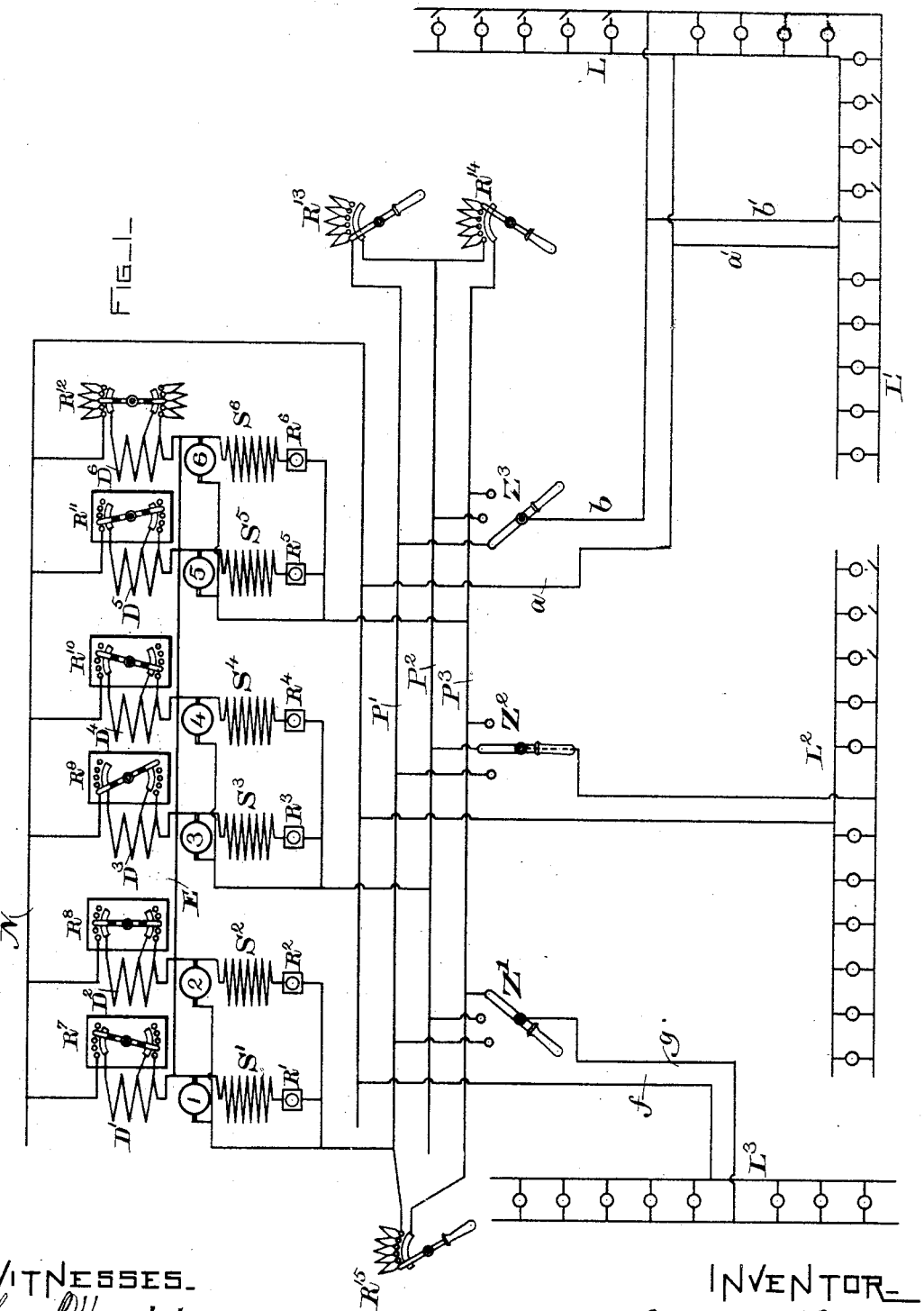

(No Model.)  3 Sheets—Sheet 2.
E. W. RICE, Jr.
SYSTEM OF ELECTRIC DISTRIBUTION.
No. 510,487.  Patented Dec. 12, 1893.
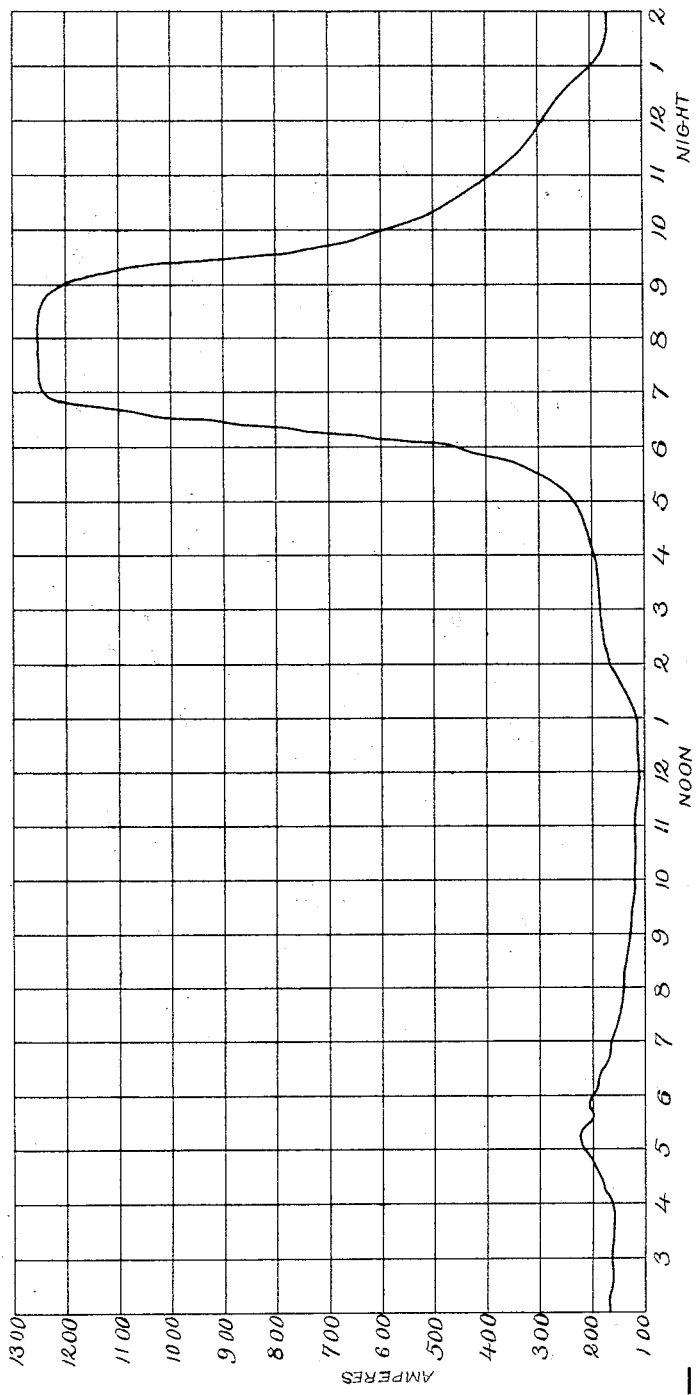

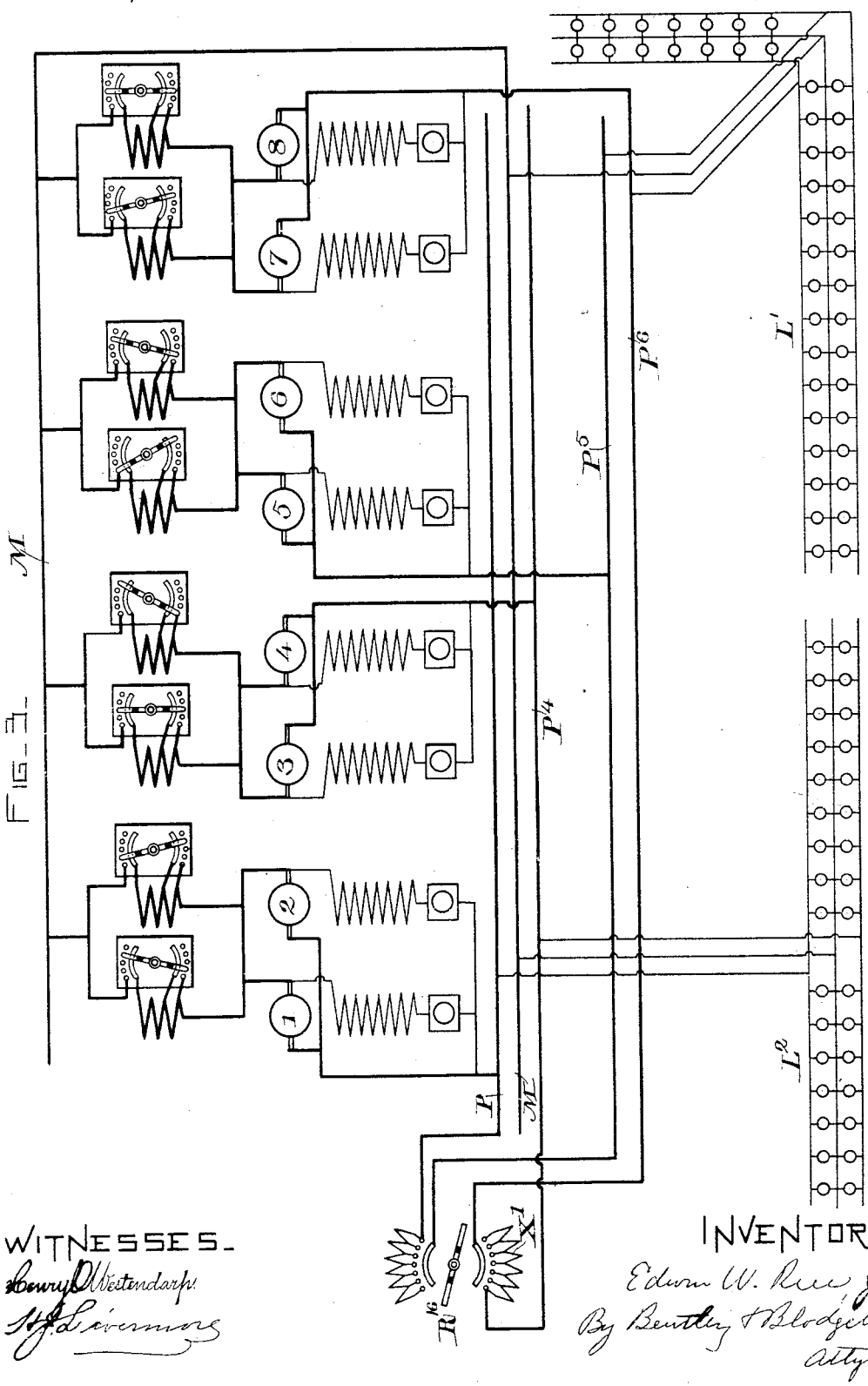

UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

SYSTEM OF ELECTRIC DISTRIBUTION.

SPECIFICATION forming part of Letters Patent No. 510,487, dated December 12, 1893.

Application filed July 10, 1893. Serial No. 480,000. (No model.)

*To all whom it may concern:*

Be it known that I, EDWIN W. RICE, Jr., a citizen of the United States, residing at Swampscott, in the county of Essex and State of Massachusetts, have invented certain new and useful Improvements in Systems of Electric Distribution, of which the following is a specification.

My present invention relates to a system of electrical distribution in which direct or commuted currents for lighting or other purposes are generated at a station and distributed over an extended area by what is known as the "feeder" system, and it particularly concerns means for regulating the potential of the current supplied to such feeders in accordance with the conditions of load so that the voltage of the current supplied to the consumption devices shall be constant or approximately constant.

The object of the invention is to secure such regulation without the necessity of installing separate or auxiliary generators in each feeder circuit, which act to assist the main generators under load, and without the necessity, when the work is supplied from feeders going to bus bars to which the generators are connected in multiple, of employing a separate resistance in each feeder circuit. Such methods of regulation have been heretofore proposed and used, but the first method requires very many machines to be installed and cared for, and is manifestly very expensive, while the latter method is very wasteful of energy in the resistance.

The present invention consists in establishing at the generating station a series of bus bars between which there exists a progressively increasing difference of potential, each bar being fed by an electric generator or set of generators and connected to one of the various feeder lines, and in connecting together the said bars by current regulating appliances, such, for instance, as resistances, by the manipulation of which, current of such potential is supplied to the feeder lines at the generating station as will maintain a constant potential where the work is located, and whereby, by suitably adjusting the potential of the generated current delivered by each machine, or set of machines, to the respective bars, and also adjusting the resistances between the separate bus bars, regulation of the current at the consuming end of the circuits of the system to approximately constant potential is obtained with a minimum loss of energy in the regulating resistances and also a suitable division of the load between the various generators feeding the system, and at a very light cost for the plant. I am familiar with the existing systems of regulating, such as those employing a resistance in each feeder circuit, and those employing series-wound generators in the feeder circuits which are adapted to raise the potential with increase of load, but my invention effects a material saving over such methods of regulation,—a saving of the loss of energy in the resistances in the first instance, and a saving of the cost and maintenance of the auxiliary or series-wound generators in the latter case.

The invention will be understood by reference to the accompanying drawings.

Referring to Figure 1, the machines 1 to 6 are compound wound electric generators having shunt field coils $S', S^2, S^3, S^4, S^5$ and $S^6$, and direct coils or windings $D', D^2, D^3, D^4, D^5$ and $D^6$ through which flows the main generated current. The excitation of the shunt field coils can be governed by rheostats $R', R^2, R^3, R^4, R^5$ and $R^6$, in the circuit of such field coils between the positive and negative terminals of the machines, and the current of the direct field coils may be likewise controlled by rheostats $R^7, R^8, R^9, R^{10}, R^{11}$ and $R^{12}$. One pole of each generator is connected to a bus bar, which may be positive or negative, and is assumed to be negative. The other poles of the generators lead to bus bars $P', P^2, P^3$ respectively, which may be positive or negative, but in this case are assumed to be of positive potential. Two or more machines may be connected in multiple to the same bar. Thus machines 1 and 2 are shown as connected in multiple relation between the bars N and $P'$, the machines 3 and 4 as connected in multiple relation between the bars N and $P^2$, and the machines 5 and 6 as connected in multiple relation between the bars N and $P^3$. It is understood that one, two, three or more machines may constitute the unit current source which supplies the respective bars, as may be required by the conditions of service in any particular installation. An equalizing connection, E, preferably connects all the machines together at a point between the series field coil and the commutator brush nearest thereto, and operates to maintain the proper division of work between the different machines, as set forth in a patent to E. W. Rice, Jr., No. 328,253, dated August 6, 1885. Between the bars $P'$ and $P^2$ is placed a switch $R^{13}$ by which the said bars may be connected through an adjustable resistance, and between the bars $P^2$ and $P^3$ there is a similar switch $R^{14}$. There may also be another switch $R^{15}$ between the bars $P'$ and $P^3$. Translating devices, $L, L'$, &c., such for instance, as incandescent lamps, are supplied with current by a feeder circuit comprising the line $a$ going to the bar N, and the line $b$ to the bar $P'$, and other translating devices, $L'$, may also be fed from the lines $a$ $b$ by branch feeder circuits comprising the lines $a', b'$. The lines $d\ e$, feeding the translating devices $L^2$ are connected to the bars N and $P^2$, respectively, and the lines $f\ g$ feeding the translating devices $L^3$ to the bars N and $P^3$, respectively. Switches $Z', Z^2$, and $Z^3$ are shown by which the current used on any of the said feeder circuits, $a\ b$, &c., can be supplied from any set of bars, that is, by the bars N and $P'$, N and $P^2$, or N and $P^3$. Having now shown the arrangement of the generators, the switches and the circuit connections to the work, which are used in carrying out the invention, the operation of the system will be described, as follows.

Assuming that all of the switches $R^{13}$, $R^{14}$, $R^{15}$, are open, so that there is no connection between the bus bars $P', P^2, P^3$, the dynamos will of course deliver current to only those particular bars to which they are directly connected. If the translating devices are at a relatively short distance from the generating station and the drop of potential in the feeder circuit comprising the lines $a\ b$ is not very large, the dynamos 1 and 2 are compounded so as to generate current at a potential of, say, five per cent. to ten per cent. higher than is needed at that part of the circuit in which the translating devices are situated, and this percentage represents the drop due to loss in transmission. Thus, if the translating devices demand a current of one hundred volts potential the generated current will be from one hundred and five to one hundred and ten volts, according to the number of translating devices in operation. Since the machines are compounded, they give a gradually increasing potential as translating devices L are put in circuit and the load increases, to compensate for the increased loss in transmission, but if the current through the feeders $a\ b$ is largely increased, as by the addition of translating devices $L'$, the machines 1 and 2 may not be able to generate enough current at the higher potential to meet the demand. Under such conditions, the bus bar $P'$ may be connected to the bar $P^2$ by means of the switch $R^{13}$ through all or a portion of the resistance. The bar $P^2$ is fed by the machines 3 and 4 which are assumed to be running normally at higher potential than the machines 1 and 2. They may, for instance, be adjusted to give one hundred and thirty volts, more or less, when under no load, and to gradually increase the potential of the current above this amount as the load comes on. When the bars $P'$ and $P^2$ are connected as described, the dynamos 3 and 4 assist the dynamos 1 and 2 feeding the translating devices $L, L'$, and the switch $R^{13}$ is so adjusted, as regards the resistance in circuit, that the load will be divided between the machines 1, 2 and 3, 4, in proper proportion. Again, the translating devices $L^2$ normally fed by the bus bars N and $P^2$ may require a greater impressed potential upon the feeders $e\ f$ at the generating station than that delivered to the feeders $a\ b$; that is, they may be situated at a greater distance from the station or may be more in number, demanding a larger current. There would then exist a greater drop of potential, with a given size of conductor, in the feeder lines $d$ $e$ than existed in the case of the lines $a\ b$. In this instance when the number of translating devices $L^2$ is small, and the load relatively light, the potential of one hundred and thirty volts, which it has been assumed is about the normal potential or no-load potential of the current delivered by the generators 3 and 4 to the bus bars N and $P^2$, is ample to maintain the proper work potential at the translating devices $L^2$, and the generators 3 and 4 are also compound wound so that as translating devices $L^2$ are added the said generators deliver an augmented potential to maintain a suitable pressure at the said translating devices $L^2$, and these machines are likewise adjusted by the resistances $R^9$ and $R^{10}$ to compensate for a certain loss in the feeders $d\ e$, but when the number of translating devices $L^2$ is so increased that the machines 3 and 4 are not able to supply the increased current at the increased potential required to maintain the proper voltage at the translating devices $L^2$ the bus bar $P^2$ is connected to the bar $P^3$ through the whole or a part of the resistance at the switch $R^{14}$, and the machines 5 and 6 which are so adjusted as to generate currents of a potential above that of the machines 3 and 4, as, say, one hundred and fifty volts or more, now assist the said machines 3 and 4 in supplying current to the translating devices $L^2$, just as in the former case the machines 3 and 4 assisted the machines 1 and 2 in feeding current to the translating devices L. The machines 5 and 6 are also compound wound and therefore capable of compensating for changes in the number of translating devices $L^2$ connected between the bus bar N and $P^3$. Another switch $R^{15}$ is placed between bars $P'$ and $P^3$ and, if desired, the machines 5 and 6 may be used to assist the machines 1 and 2 in feeding the translating devices $L, L'$. In fact the invention contemplates the adjustment of the resistances between the different bus bars in various combinations to supply current of the proper potential to the feeder lines leading from the station, and it is the purpose also, if the conditions of the load warrant it, to adjust the machines 1 and 2 so that their current shall be of equal potential to that of the machines 3 and 4, that is, when the drop of potential in the feeder lines $a$ and $b$ has become so great as to demand a current of the potential generated by the machines 3 and 4 it is evident that the machines 1, 2 and 3, 4 may be run as a unit and the bus bars $P'$ and $P^2$ are of the same potential, and in this case the switch $R^{13}$ would be closed with all the resistance cut out, as shown in the figure, and the lines $b$ and $e$ could be connected to either of the bars $P'$ or $P^2$ by the switches $Z^2$ and $Z^3$, respectively, or to both. In the same manner the machines 3 and 4 might be adjusted to deliver currents of the same potential as the machines 5 and 6 and, in fact under the condition of maximum load all of the machines, 1 to 6 inclusive, might generate currents of the same potential, the differentiation of potential supplied by the different machines or groups of machines being established at those times when a large variation exists in the demand upon the different feeder lines leading from the station.

In the operation of a bank of generators in the manner herein described it will be the duty of the person in charge to make such an adjustment of the switches $R^{13}$, $R^{14}$, and $R^{15}$, and likewise in the compounding of the generators by means of the resistances $R^7$ to $R^{12}$ inclusive, as will furnish current of the required potential to the various feeder lines $a\ b,\ d\ e,\ f\ g$, or to other feeder lines constituting the distributing system of mains, at the same time that the current flowing through the resistances at the switches $R^{13}$, $R^{14}$ and $R^{15}$ is maintained at a minimum.

In Fig. 2 is plotted a load curve which will fairly represent the demand for current during the various hours of the day on a lighting circuit. Between the hours of two p. m. and four p. m. the load is usually relatively small, so that the drop of potential in the feeder circuits is low, and currents whose potential is regulable within the capacity of the machines 1 and 2 suffice during this period. Between four p. m. and six p. m. the demand gradually increases, and at this time the generators 3 and 4 are called upon to assist the machines 1 and 2, and perhaps, also, the machines 5 and 6, to some degree. From this time until seven p. m. the demand for current rapidly increases and it is necessary to raise the potential of the supplied current at the generating station accordingly by the manipulation of the regulating appliances in the manner above described. After nine p. m. or after eleven p. m. depending upon the location of the plant, there is a rapid decrease in the number of lights used and the regulation at the generating station is then accomplished in an inverse order to that described. The load curves show that the resistances at the switches $R^{13}$, $R^{14}$ and $R^{15}$ are employed mainly on the steep part of the curves, and, therefore, the time during which the maximum loss of energy occurs in the resistances is quite short. It will be evident then that the efficiency of the system can be made very high, depending upon the arrangement of the apparatus to suit the conditions in any particular case, and depending upon the proper adjustment being made at the station during changes of load.

In Fig. 3 there is shown in diagram the application of the invention to a three-wire system of distribution, the machines 1 and 2, 3 and 4, going to one set of three-wire bus bars, and the machines 5 and 6, 7 and 8, going to another set of three-wire bus bars, the two sets operating at different potentials. The neutral or middle bus bar of each set of machines may be united as shown into one bar N. The machines 1 and 2 are connected in multiple between the middle conductor M and one of the outside bars, P, of the three-wire system, and the machines 3 and 4 between the middle conductor M and the other outside bar $P^4$ of the three wire system. The machines 5 and 6, 7 and 8 are similarly connected between the middle conductor M and the bars $P^5$ and $P^6$, and three wire feeder lines lead from the respective sets of bars to the distant translating devices. A rheostat $R^{16}$ is arranged so that the bars P and $P^5$ of, for instance, positive potential, may be connected together with more or less resistance, or with no resistance, between them, and the negative bars $P^4$ and $P^6$ likewise connected through an equal resistance $X'$ by the operation of the rheostats $R^{16}$, and in this manner the group of machines 5 and 6, 7 and 8, which may be adjusted to deliver a higher potential of current, as in the case of the machines 5 and 6, Fig. 1, may assist the group of machines 1 and 2, 3 and 4, of the other set, and during the maximum conditions of load the potential developed by the two sets may be equal. To avoid unnecessarily complicating the diagrams illustrating the invention, only a few feeder lines are indicated, but it is to be understood that a number of such lines might be used in the same manner as is done in existing installations. It is also to be understood that, while in the drawings and specification reference has been made particularly to compound-wound dynamos, shunt-wound dynamos could also be used in such a system, and in some cases might be preferred; such machines being regulated to run at different potentials under certain conditions of service, or at the same potential under other conditions, the same arrangement of multiple bus bars, intermediate regulating devices, such as resistances, and interconnecting switches between the multiple bus bars, being employed as are shown for the compound-wound dynamos illustrated and described above.

What I claim as new, and desire to secure by Letters Patent, is—

1. In a system of electrical distribution, the combination with two or more generators or groups of generators adapted to normally generate currents of different potential, of feeders connected respectively to said generators and supplying consumption circuits or devices with current, and means for keeping said circuits independent of one another or inter-connecting them at will so that generators of higher and lower potential are caused to simultaneously feed a single circuit, as set forth.

2. The combination in a system of electrical distribution, of a bank or battery of electric generators divided into sets adapted to generate currents of different potential, corresponding sets of bus bars to which those generators supplying current of the same potential are respectively connected, feeder lines led from the respective sets of bars, and current regulating devices for interconnecting the bars of the same polarity but of different potential, whereby the feeder line or lines connected to any given bar or rail may receive current from two or more sources of different potential.

3. In a system of electrical distribution the combination with a bank or battery of electric generators divided into sets adapted respectively to generate currents of different potential, of an equalizing connection between all of said generators, bus bars connected respectively to each of said sets, feeder circuits therefrom, and current regulating devices for interconnecting the bars of the same polarity but of different potential, whereby the feeder line or lines connected to any given bar or rail may receive current from two or more sources of different potential.

4. The combination with a bank or battery of dynamo electric machines, of a common bus bar to which one terminal of each machine is connected, a multiple set of bars of progressively increasing potential of opposite name or polarity to that of the common bar to which the other terminals of the machines are respectively connected, and regulable resistances adapted to connect said multiple bars, as described.

5. The combination with a bank or battery of electric generators divided into sets of two or more machines or groups of machines in series, of a separate pair of bus bars fed by the machines in each set, three-wire feeder systems supplied respectively from said pairs of bus bars, and a neutral or compensating wire common to all the machines to which all the neutral wires of said three-wire feeder systems are connected, as set forth.

6. In a three-wire system of distribution, substantially as described, the combination with two or more sets of bus bars connected respectively with generators or groups of generators adapted to generate currents of different potential, of double rheostatic switches through which the bars of one of said sets can be connected to the bars of another, and a single neutral conductor common to all the generators to which the neutral wires of the feeder circuits are connected, as set forth.

7. A system of electrical distribution, comprising two or more generators or multiple groups of generators wound to give current of different potentials and compounded to vary their respective potentials within certain limits, sets of bus bars connected respectively to said generators or multiple groups of generators and adapted to feed current to translating devices in different circuits, and means whereby any of said sets of bus bars may be regulably connected to any other such set carrying current of higher potential, substantially as and for the purpose described.

In witness whereof I hereunto set my hand this 7th day of July, 1893.

EDWIN W. RICE, JR.

Witnesses:
JOHN W. GIBBONEY,
BENJAMIN B. HULL.